(12) United States Patent
Cheng et al.

(10) Patent No.: US 10,091,181 B2
(45) Date of Patent: *Oct. 2, 2018

(54) SUPPRESSION OF AUTHORIZATION RISK FEEDBACK TO MITIGATE RISK FACTOR MANIPULATION IN AN AUTHORIZATION SYSTEM

(71) Applicant: International Business Machines Corporation, Armonk, NY (US)

(72) Inventors: Pau-Chen Cheng, Yorktown Heights, NY (US); Lawrence Koved, Pleasantville, NY (US); Kapil K. Singh, Cary, NC (US); Calvin B. Swart, Poughkeepsie, NY (US); Sharon M. Trewin, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/618,283

(22) Filed: Jun. 9, 2017

(65) Prior Publication Data
US 2017/0279787 A1  Sep. 28, 2017

Related U.S. Application Data

(63) Continuation of application No. 14/974,170, filed on Dec. 18, 2015, now Pat. No. 9,781,095.

(51) Int. Cl.
*H04L 9/32* (2006.01)
*G06F 21/31* (2013.01)
(Continued)

(52) U.S. Cl.
CPC ............ *H04L 63/08* (2013.01); *G06F 21/31* (2013.01); *G06F 21/577* (2013.01); *H04L 63/10* (2013.01);
(Continued)

(58) Field of Classification Search
CPC ..... H04L 63/08; H04L 63/10; H04L 63/1433; G06F 21/31; G06F 21/577
See application file for complete search history.

(56) References Cited

U.S. PATENT DOCUMENTS 7,266,089 B2 * 9/2007 Cook .................... H04W 84/12
370/254
7,490,347 B1 * 2/2009 Schneider ........... H04L 63/0815
713/157

(Continued)

OTHER PUBLICATIONS

Gupta, A, et al. "Intuitive security policy configuration in mobile devices using context profiling" Privacy, Security, Risk and Trust (PASSAT), 2012 International Conference on and 2012 International Conference on Social Computing (SocialCom) IEEE, Sep. 3-5, 2012, pp. 471-480.

(Continued)

*Primary Examiner* — Linglan E Edwards
(74) *Attorney, Agent, or Firm* — Scully, Scott, Murphy & Presser, P.C.; Jeffrey LaBaw, Esq.

(57) ABSTRACT

Dynamic risk communication associated with a computer device may include automatically detecting one or more security risk factors for the computer device based on current context information associated with the computer device. Whether an attempt is being made via the computer device to manipulate the one or more risk factors in an attempt to reduce a security level of a computer-implemented authentication procedure may be determined. Responsive to determining that the attempt is being made to manipulate the one or more risk factors, a new challenge for additional identification may be communicated for presentation on a user interface device of the computer device while suppressing one or more security risk factors from being presented on the user interface device. Responsive to determining that an attempt is not being made to manipulate (Continued)

the one or more risk factors, the new challenge and one or more security risk factors may be communicated.

20 Claims, 4 Drawing Sheets

(51) Int. Cl.
*H04L 29/06* (2006.01)
*G06F 21/57* (2013.01)
*H04W 12/06* (2009.01)
*H04W 12/08* (2009.01)
*H04W 12/12* (2009.01)

(52) U.S. Cl.
CPC ......... *H04L 63/1433* (2013.01); *H04W 12/06* (2013.01); *H04L 63/1425* (2013.01); *H04W 12/08* (2013.01); *H04W 12/12* (2013.01)

(56) References Cited

U.S. PATENT DOCUMENTS

| | | | | |
|---|---|---|---|---|
| 7,546,276 B2* | 6/2009 | Randle | ............... | G06F 21/31 705/65 |
| 7,577,994 B1* | 8/2009 | Sobel | ............... | G06F 21/31 709/225 |
| 7,607,164 B2* | 10/2009 | Vasishth | ............... | G06F 21/577 709/223 |
| 7,725,737 B2 | 5/2010 | Konanka et al. | | |
| 7,832,004 B2* | 11/2010 | Schwartz | ............... | G06F 21/74 709/229 |
| 8,601,588 B1 | 12/2013 | Black et al. | | |
| 8,625,490 B2 | 1/2014 | Huang et al. | | |
| 8,655,371 B2 | 2/2014 | Huang | | |
| 8,756,650 B2* | 6/2014 | Wolfson | ............... | H04L 63/08 726/1 |
| 9,026,840 B1* | 5/2015 | Kim | ............... | G06F 21/552 714/4.3 |
| 9,104,886 B1* | 8/2015 | Dolbakian | ............... | G06F 21/62 |
| 9,286,453 B2* | 3/2016 | Boss | ............... | H04L 63/20 |
| 9,286,482 B1* | 3/2016 | Dumont | ............... | G06F 21/32 |
| 9,633,184 B2* | 4/2017 | Ben Ari | ............... | G06F 21/31 |
| 2008/0162338 A1* | 7/2008 | Samuels | ............... | G06F 21/40 705/38 |
| 2008/0172715 A1* | 7/2008 | Geiger | ............... | G06F 21/32 726/1 |
| 2010/0250921 A1 | 9/2010 | Spencer et al. | | |
| 2011/0141276 A1 | 6/2011 | Borghei | | |
| 2011/0225625 A1* | 9/2011 | Wolfson | ............... | H04L 63/08 726/1 |
| 2014/0052849 A1* | 2/2014 | Sabin | ............... | H04L 43/10 709/224 |
| 2014/0136187 A1 | 5/2014 | Wolverton et al. | | |
| 2014/0157401 A1* | 6/2014 | Alameh | ............... | G06F 21/45 726/17 |
| 2014/0289820 A1* | 9/2014 | Lindemann | ............... | G06Q 20/42 726/5 |
| 2015/0371064 A1* | 12/2015 | Dayan | ............... | G06F 21/87 726/34 |

OTHER PUBLICATIONS

Kelley, P.G., et al. "User-controllable learning of security and privacy policies" Proceedings of the 1st ACM workshop on Workshop on AISec. ACM, Oct. 27, 2008, pp. 11-18.

Miettinen, M., et al. "Towards security policy decisions based on context profiling" Proceedings of the 3rd ACM workshop on Artificial intelligence and security. ACM, Oct. 8, 2010, pp. 19-23.

Tondel, I.A., et al., "Learning privacy preferences" Availability, Reliability and Security (ARES), 2011 Sixth International Conference on IEEE, Aug. 22-26, 2011, pp. 621-626.

Srinivasamurthy, S., et al. "Security and Privacy in Cloud Computing: A Survey" Parallel & Cloud Computing 2.4, Oct. 31, 2013, pp. 126-149, vol. 2, Iss. 4, American V-King Scientific Publishing, LTD.

List of IBM Patents or Patent Applications Treated as Related, dated Jun. 9, 2017, 2 pages.

* cited by examiner

US 10,091,181 B2

SUPPRESSION OF AUTHORIZATION RISK FEEDBACK TO MITIGATE RISK FACTOR MANIPULATION IN AN AUTHORIZATION SYSTEM

STATEMENT REGARDING FEDERALLY SPONSORED RESEARCH OR DEVELOPMENT

This invention was made with Government support under Contract Numbers: FA8750-12-C-0265 awarded by U.S. Air Force, Office of Scientific Research. The Government has certain rights in this invention.

FIELD

The present application relates generally to computers and computer applications, and more particularly to computer security.

BACKGROUND

Many of the traditional computer security indicators are static. Others provide feedback to users, such as the lock icon in a web browser. Security risk factors when authenticating a user of a computer device may include time of use, location of use, crowdedness of the current environment from where the computer device is being used, security posture of the authentication device (e.g., smartphone, tablet computer), and/or others.

When using a computer device, or for example logging onto a computer system via a computer device, a user may be requested to follow an authentication procedure such as entering a password. An automated computer security authentication process may also request additional information from the user to authorize or authenticate the user into the computer device or computer system.

Users may consider an authentication procedure as a secondary task, and as a disruption to the primary task. An automated computer system may provide an explanation of why this secondary (authentication) task might be necessary. Such risk communication provides an ordinary user with information as to why additional authentication challenges are being presented to the user, thus justifying more user effort.

BRIEF SUMMARY

A computer-implemented method and system of dynamic risk communication associated with a computer device may be provided. The method, in one aspect, may include automatically detecting one or more security risk factors for the computer device based on current context information associated with the computer device. The method may also include determining whether an attempt is being made via the computer device to manipulate the one or more security risk factors in an attempt to reduce a security level of a computer-implemented authentication procedure. The method may also include, responsive to determining that the attempt is being made to manipulate the one or more security risk factors, communicating a new challenge for additional identification for presenting on a user interface device of the computer device and suppressing the one or more security risk factors from being presented on the user interface device. The method may also include, responsive to determining that an attempt is not being made to manipulate the one or more security risk factors, communicating the new challenge for additional identification and the one or more security risk factors for presentation on the user interface device.

A system for dynamic risk communication associated with a computer device, in one aspect, may include one or more computer processors coupled to a memory. One or more of computer processors may be operable to automatically detect one or more security risk factors for the computer device based on current context information associated with the computer device. One or more of computer processors may be further operable to determine whether an attempt is being made via the computer device to manipulate the one or more security risk factors in an attempt to reduce a security level of a computer-implemented authentication procedure. Responsive to determining that the attempt is being made to manipulate the one or more security risk factors, one or more of computer processors may be further operable to communicate a new challenge for additional identification for presenting on a user interface device of the computer device and suppress the one or more security risk factors from being presented on the user interface device. Responsive to determining that an attempt is not being made to manipulate the one or more security risk factors, one or more of computer processors may be further operable to communicate the new challenge for additional identification and the one or more security risk factors for presentation on the user interface device.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
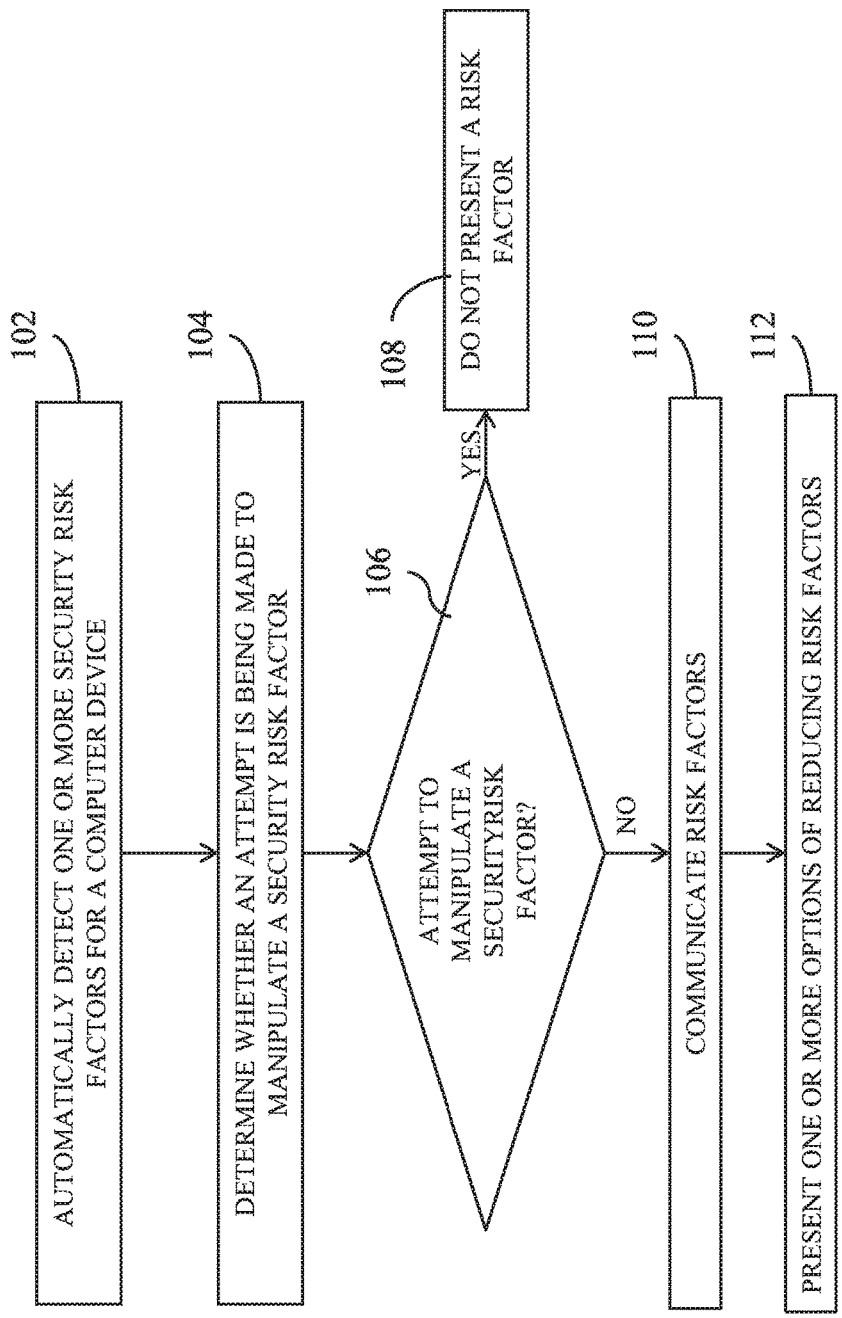
FIG. 1 is a flow diagram illustrating a method of the present disclosure in one embodiment for dynamic risk communication, for example, for a computer and/or mobile device.

An authorization decision when using risk estimation to determine how much authentication is required for the authorization may involve one or more risk factors. Such risk factors may include the value at risk, time of day of the request, the geolocation where the request was made, local infiltration types and local infiltration rate, the crowdedness of the area in which the transaction is being made, the confidence about the user's identity, the security state of the device, and/or other factors.

An automated computer system or process may use visual and non-visual feedback to tell the user why additional authentication is required for authorization based on the level of risk (e.g., the value at risk versus the benefit). This may include various visualization techniques, for example, which may include gauges, dials and icons presented on a display device.

The communication of these risk factors may provide an attacker (e.g., an automated computer or a manual user) an advantage when trying to game the system so as to mitigate the risk factors in order to successfully authenticate to the system.

A system, method and/or techniques are presented that detect when the user or an automated computer program is trying to game the system so as to reduce or suppress the risk communication, thus thwarting the attacker's attempts at gaining insight or clues as to which factors represent an increased risk. For instance, a system and/or method in one embodiment of the present disclosure, responsive to detecting or observing attempts to mitigate environmental risk factors, may suppress or reduce presentation of risk factors at a computer device that is interacting with a user for authentication.

A system and/or method in one embodiment may observe and detect one or more attempts to mitigate the risk, for example, by changing geolocation, turning off networking devices (e.g., Bluetooth, near field communication (nfc)). It is possible to switch from presentation of the multiple risk factors to the display of a single risk icon (e.g., similar to an engine warning light on a car dashboard). Another approach is to switch from a presentation that shows the magnitude of each of the risk factors, e.g., on a [0-1] scale to a binary representation, e.g., similar to the engine warning light on a car dashboard. Other techniques may include analyzing the historical patterns for authentication and authorization to determine whether the attempts to reduce the risk (e.g., lower the risk factor anomaly scores) are consistent or not with the user's earlier behaviors.

A system and/or method in one embodiment of the present disclosure communicate specific risk factors to users of an authorization system. Communicating these risk factors enables a legitimate user to understand the authentication requests made by the system, leading to greater acceptance and safer user behavior. However, such feedback could be exploited by an attacker in an attempt to manipulate risk factors to convince the system that the device is in a lower risk situation so as to make it easier to break in. In the present disclosure in one embodiment, when the user's behavior suggests they are attempting to exploit the risk feedback to reduce authorization requirement, the specific risk factor feedback is withdrawn, thus thwarting the attacker's attempts at gaining insight as to which factors represent an increased risk. In one embodiment, when an attempt to exploit the feedback is detected, the system may increase security (e.g., authentication) requirements. In one embodiment, a system and/or method may provide communication specifically intended to encourage attackers to try to game the system.

Consider for example that an attacker steals a mobile device from a table in a coffee shop and leaves with it. In a side street, the attacker attempts to gain access to the owner's bank account. The authentication system (e.g., coupled to or associated with the bank account or the mobile device) detects two risk factors: the user has never authenticated from this location before, and the user's smartwatch (or another of the user's devices) is usually detectable via Bluetooth (or another sensor or network), but is not connected or nearby. These risk factors cause the authentication system (e.g., associated with the bank) to request additional identification information, e.g., two forms of identification instead of only one. The risks are communicated to the user, to explain why a higher level of authentication is requested. The attacker sees a message saying "This is an unusual location for you, and your smartwatch is not present. Please provide two forms of identification." The attacker turns off Bluetooth (or another sensor) on the phone, such that by making smartwatch (or another of user's device) detection impossible, this risk factor is no longer considered by the authentication system. A system and/or method of the present disclosure in one embodiment may recognize this action (e.g., the attacker turning off the Bluetooth or another sensor) as a possible or candidate attempt to manipulate the authentication system to reduce risk factors. The authentication system of the present disclosure in one embodiment (e.g., coupled to or associated with the bank) may increase the risk level further, change the screen prompt to: "Please provide two forms of identification." Now, even if the attacker returns to the café and sits near the phone's owner, the attacker will not know whether the café location was considered low risk, and will still be faced with a high security (authentication) barrier.

The system and/or method of the present disclosure, for example, may detect risk factors, detect attempts to manipulate risk factors, and provide risk factor information to the user when no manipulation is detected. FIG. 1 is a flow diagram illustrating a method of the present disclosure in one embodiment for dynamic risk communication, for example, for a computer and/or mobile device.

At 102, an authentication system or process, for example, executing on one or more computer or hardware processors, may automatically detect one or more security risk factors for a computer device associated with a user, e.g., a mobile device of a user. Examples of a computer device may include, but are not limited to, a laptop computer, a tablet, a smartphone, a cellular phone, and/or others. For example, the authentication system or process may communicate with one or more sensors coupled to the computer device to detect one or more risk factors particular to, or customized to, the user of the computer device. The authentication system or process may also retrieve historical data associated with the computer device and retrieve patterns of activity associated with the computer device from the historical data to detect one or more risk factors.

For instance, the authentication system or process may detect that the device is in a new or unusual location as a risk factor based on communicating with the device regarding the location of the device. For instance, the device may include a global positioning system (GPS) receiver or the like that detect the current location of the device, and the location is communicated to the authentication system or process. The authentication system or process may compare this location with the historical pattern of locations of the computer device or the user of the computer device and detect whether the current location is a new or unusual location.

As another example, the authentication system or process may detect as a risk factor that the device has been travelling at a running pace, where the user does not usually run at this time or when attempting to do this task for which the authentication is being requested. For instance, the authentication system or process may communicate with a motion sensor or the like coupled to the device that senses the motion of the device, compare the motion pattern and compare with the historical pattern to detect whether the travelling pattern is unusual for the user of the device.

As yet another example, the authentication system or process may detect as a risk factor that the wireless environment is unusual, for example the user's other wireless devices are not present, or unexpected wireless devices are present. For instance, the authentication system or process may communicate with one or more wireless devices to detect wireless connections on the device.

Still as another example, the authentication system or process may detect as a risk factor that the device is in a crowd, based on ambient noise and the presence of other computing devices. For instance, noise may be detected by communicating with a microphone or like device coupled to the device that may receive surrounding sound data. Other computing devices may be detected, for example, by wireless communications.

As another example, the authentication system or process may detect as a risk factor that the device is in an area with high security risk, for example, by comparing the location information of the device received via a GPS device or the like coupled to the device and information available about that location.

In one aspect, the authentication system or process may detect one or more risk factors, responsive to receiving a request to authenticate a user into, for example, one or more computer applications, servers, or the device itself, e.g., to be able to interact with the device, interact with a computer application or connect to a server, or the like, for example, to perform a function.

At 104, it is determined whether an attempt is being made to game the system. For example, a user who is trying to get authenticated may be attempting to break into an authentication system of the device or an application or server or the like, for example, by manipulating risk factors. The current user actions or behavior with respect to the device, the device's current context and/or other information may be used to determine whether a breach or break into an authentication system is being attempted.

For instance, attempts to manipulate risk factors can be detected by detecting that the user is repeatedly initiating a transaction but does not proceed past the authentication prompt. This type of user action may be an indication that the user is observing system risk assessment, for instance, for purposes of breaking into the system. As another example, whether an attempt is being made to manipulate risk factors may be detected by detecting that a sensor or communication device is turned off. For example, a user may turn Bluetooth, WiFi or cellular services off between access attempts, to disable those devices. Another example of detecting that an attempt is made to manipulate risk factors may include detecting that the user changes location between access attempts. Yet as another example, if one or more contextual or environmental factors (e.g., network geolocation, location, network access point) are not consistent with prior behaviors, it may be determined that an attempt is being made to manipulate risk factors. For instance, contextual or environment factors may be determined based on communicating with one or more sensors, GPS devices or the like coupled to the device. Prior behaviors may be determined based on analyzing historical patterns of user behavior associated with the device, e.g., when carrying the device.

Another example of detecting an attempt to manipulate risk factors may include analyzing the historical patterns for authentication and authorization to determine whether the attempts to reduce the risk (e.g., lower the risk factor anomaly scores) are consistent or not with the user's earlier behaviors.

If at 106, it is determined that an attempt is being made to manipulate one or more risk factors, the risk factors are hidden from the user at 108, e.g., no explanation as to the risk factor that prompted the additional authentication information is presented to the user.

Otherwise, at 110, the risk factors are communicated, that is, responsive to determining that the user is not trying to game the system or manipulate a risk factor. In one embodiment, communication of risk factors only occurs if the above behaviors are not detected. Risk factors can be communicated through text prompts, audio feedback, icons, graphic animations, videos, risk meters, or any other method. In one aspect, presentation may be switched from presentation of the multiple risk factors to the display of a single risk icon, e.g., similar to an engine warning light on a car dashboard. Another approach may include switching from a presentation that shows the magnitude of each of the risk factors, e.g., on a [0-1] scale to a binary representation, e.g., similar to the engine warning light on a car dashboard.

In one aspect, the method of the present disclosure communicates specific risk factors except when the method detects that the user is attempting to game the system by trying to manipulate the system into a low(er) risk state (e.g., find a location that is familiar) to lower the security barrier of entry. In this way, an authentication system's usability may be improved by making the system more transparent (e.g., providing a reason for a failed authentication session), but limits attempts by an attacker to exploit this feedback to break the security of the system.

In another aspect, the communication of risk factors may only designate a level of risk, e.g., low, medium or high risk factor.

Another aspect of the present disclosure may incorporate feedback information into the risk estimation. For example, when a risk factor is communicated to the user, the user is presented with one or more choices to input to the system whether the risk estimation is correct. For example, the system of the present disclosure may indicate that there are many people/devices nearby that are increasing the risk. If the user is an apartment dweller, there may be many wireless devices nearby, but few (if any) people other than the owner of the device. The system can incorporate this feedback into its modeling of the user's environment. As another example, if it is determined that the user is trying to game the system, the system can record this as historical information and use as one of the contextual factors to be considered in future authentication attempts. For example, if it is determined that there were attempts to try to manipulate the location to reduce risk by the location factor, the system may choose to ignore location during future authentication attempts. In another aspect, the system may use the location information (or close proximity) and decide that it is a high(er) risk location.

At 112, one or more options of reducing risk factors may be presented to a user. For instance, in higher risk locations, the system may provide information to the user about how to lower the risk (e.g., if it is determined that the current user is not trying to manipulate risk factors). Examples of lowering risks may include, but are not limited to, factors such as moving to a location where fewer other people are present, turning on a sensor coupled to the device, e.g., their Bluetooth headset to use as a second authentication factor.

Further, in busy locations the system can mitigate risk for the user by offering authentication options that are resistant to observation, such as a password prompt that does not echo the user's keystrokes to the screen, or a signature prompt that reduces the visibility of the signature as it is drawn on a touch screen.

As described above, an active feedback may be provided on the nature of the security and/or authentication risks, and one or more options by which the user may reduce the authorization risk may be provided. The method of the present disclosure may also allow the user to provide feedback to the system when the actual risk is less than (or higher than) the system calculated risk. This feedback can be used as labels to train the system to better identify and/or classify risk factors.

The present disclosure in one embodiment may also provide visualization, for example, a graphical user interface display on a display component of the device. The method of the present disclosure, for example, may present one or more active icons, e.g., visual or auditory, which explain the risk factors. These explanations describe the risk factors, and may optionally describe the severity of the risk factors in the overall authorization decision process. Optionally, there may be an explanation of how to reduce the severity of the risk factor.

The user may be allowed to provide feedback on the accuracy of the risk factor. For example, if someone is at home, but the risk calculation indicates that it is a crowded location, the user can "correct" the system by labeling the risk factor as being incorrect and/or providing what the user believes to be the correct value (e.g., low risk). This allows the system to re-evaluate the risk factor, perhaps taking into account other risk features to reclassify the risk in the current context, after the user has proven their identity by successfully authenticating.

In one embodiment, the graphical user interface in one embodiment of the present disclosure may create and provide one or more risk indicators (e.g., icons or audio) via visual pop-ups with explanations. As described above, one or more options to mitigate security risks may be displayed to the user, for example, by pop-ups, for instance, to assist the user with the mitigation process. In another aspect, the pop-ups may include feedback buttons or other inputs elements on the user interface to generate feedback data to send to the risk calculation engine. This feedback may be used to improve the accuracy of the risk calculation models.

Figure 2:
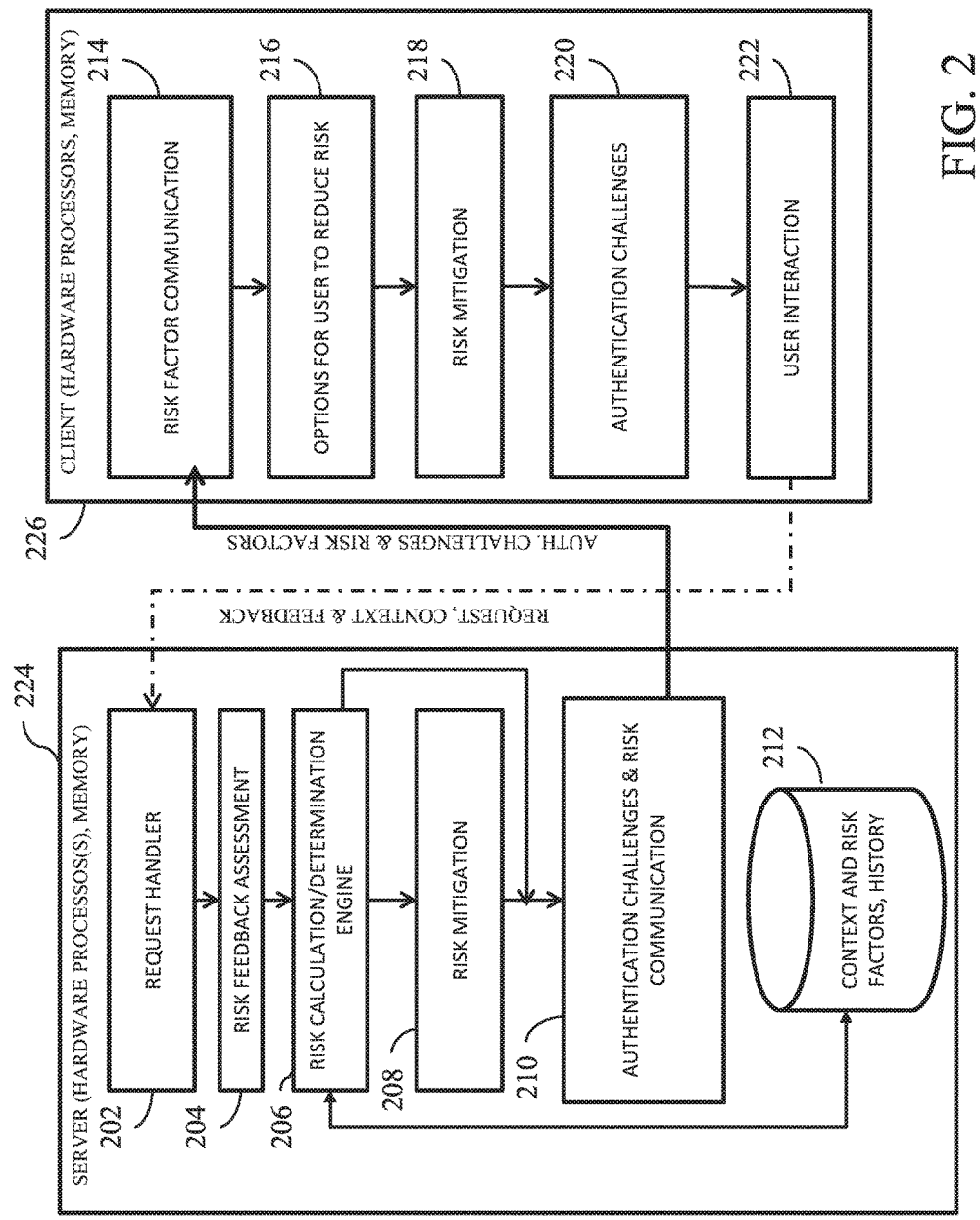
FIG. 2 is a diagram illustrating computer-implemented components of a system in one embodiment of the present disclosure.

FIG. 2 is a diagram illustrating computer-implemented components of a system in one embodiment of the present disclosure. A server component may include one or more hardware processors that execute functionalities such as request handler 202, risk feedback assessment 204, risk calculation engine 206, risk mitigation 208, authentication challenges and risk communication 210. One or more hardware processors of the server 224 may be further coupled to memory and also to persistent storage device 212 that, for example, stores context data and risk factors, and historical patterns or data.

A client component 226 may include one or more hardware processors that execute functionalities such as risk factor communication 214, presentation of options for user to reduce risk 216, risk mitigation 218, authentication challenges 220, and user interaction 222. User interaction 222 may occur via a user interface, for example, a graphical user interface (GUI). One or more hardware processors of the client 226 may be coupled to one or more memory devices. The client 226 and the server 224 communicate using a communication network, for example, a wireless channel.

The request handler 202 may receive an authentication request from a device of a user, via a user interaction 222, for example, responsive to a user attempting to authenticate into an application or the like or the device.

The risk feedback assessment 204 may process risk factors for this authentication session received from the user interaction 222, for example, by updating the information stored about the context and risk factors 212, after the user has successfully authenticated.

The risk calculation engine 206 may determine risk associated with the current context of the device (e.g., running the client 226) for example, by communicating with one or more sensor devices on the client 226, e.g., a GPS receiver, wireless device, motion sensor, noise level detector, and/or others. The calculated risk value is based on the information received from the client device's sensor data and analysis of data associated with the context and risk factors and history of patterns 212. The risk calculation engine 206 determines whether an attempt is being made to manipulate risk factors. For example, the risk calculation engine 206 may compute a risk score and based on whether the risk score exceeds a threshold value, the risk calculation engine 206 may determine that an attempt is being made to game the system.

If the risk calculation engine 206 determines that there is no risk of attempted manipulation of risk, the risk mitigation component 208 may determine risk mitigation options, which may be provided to the client 226, e.g., the device running the client 226.

The authentication challenges and risk communication 210 may send authentication challenges, for example, requesting for additional identifying information to the client 226. If it is determined that this authentication session is not attempting to manipulate risk factors, the authentication challenges and risk communication 210 also may send risk communication, for example, the specific reasons as to why additional identifying information is requested.

The risk factor communication 214 at the client 226 receives the authentication challenges, and may also receive the risk communication from the server 224. The risk factor communication 214 may also receive the risk mitigation options 216 determined by risk mitigation 208 at the server 224, and provide options to the user for reducing risk 216, risk mitigation 218 and authentication challenges 220 leading to a user interaction 222. Via the user interaction 222, the user may also provide user's feedback as to whether the authentication system's assessed risk factors are accurate. The user interface 220 may communicate the user's feedback to the server 224, for example, to request handler 202.

Figure 3:
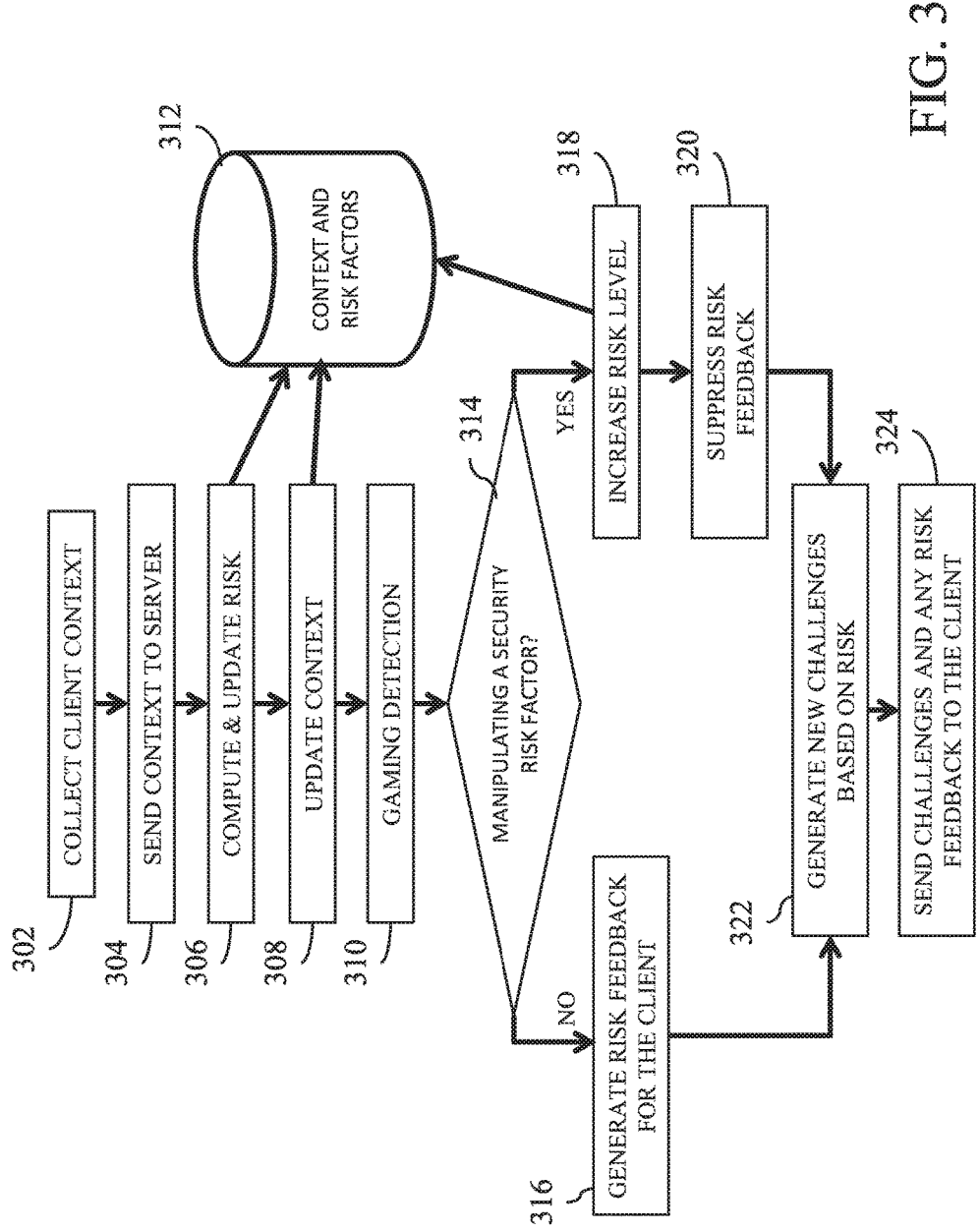
FIG. 3 is another flow diagram illustrating a method of the present disclosure in one embodiment for dynamic risk communication.

FIG. 3 is another flow diagram illustrating a method of the present disclosure in one embodiment for dynamic risk communication. At 302, context information associated with a user or user device may be collected and/or received, for example, at a client device or a device running client functionality. At 304, the context information is received at a server, for example, a dynamic feedback assessment server coupled with one or more hardware processors and memory, via a communication network or channel.

At 306, risk factors may be determined, and stored in a database of context and risk factors, e.g., in a storage device 312, for example, as described with reference to 206 in FIG. 2.

At 308, the context information may be updated or stored in the context and risk factors database 312.

At 310, determination is performed based on the context information and, for example, historical patterns, as to whether an attempt is being made to manipulate one or more risk factors, for example, as described above, with reference to 104 in FIG. 1.

At 314, if it is determined that an attempt is being made to manipulate a risk factor, at 318, the risk level is increased for this authentication request, and the increased risk level is stored at 312 to correspond to the current context information. At 320, risk feedback to the user (e.g., reasons as to why additional authentication identification requested) is suppress.

At 314, if it is determined that the user in this authentication request is not attempting to manipulate a risk factor, at 316, risk feedback to present to the client (e.g., running on the user's device) is generated.

At 322, new challenges based on risk is generated, for instance, new questions or additional identifying request may be generated.

At 324, the new challenges (questions, request for additional information) may be sent to the client (e.g., running on the user's device) for display or presentation on the user interface of the device. If risk feedback (specific information as to the reason for additional request or challenge) is to be presented, e.g., because at 310 it is determined that this is an authentic authentication session (not an attempt to game the system), risk feedback is also sent to the client.

Figure 4:
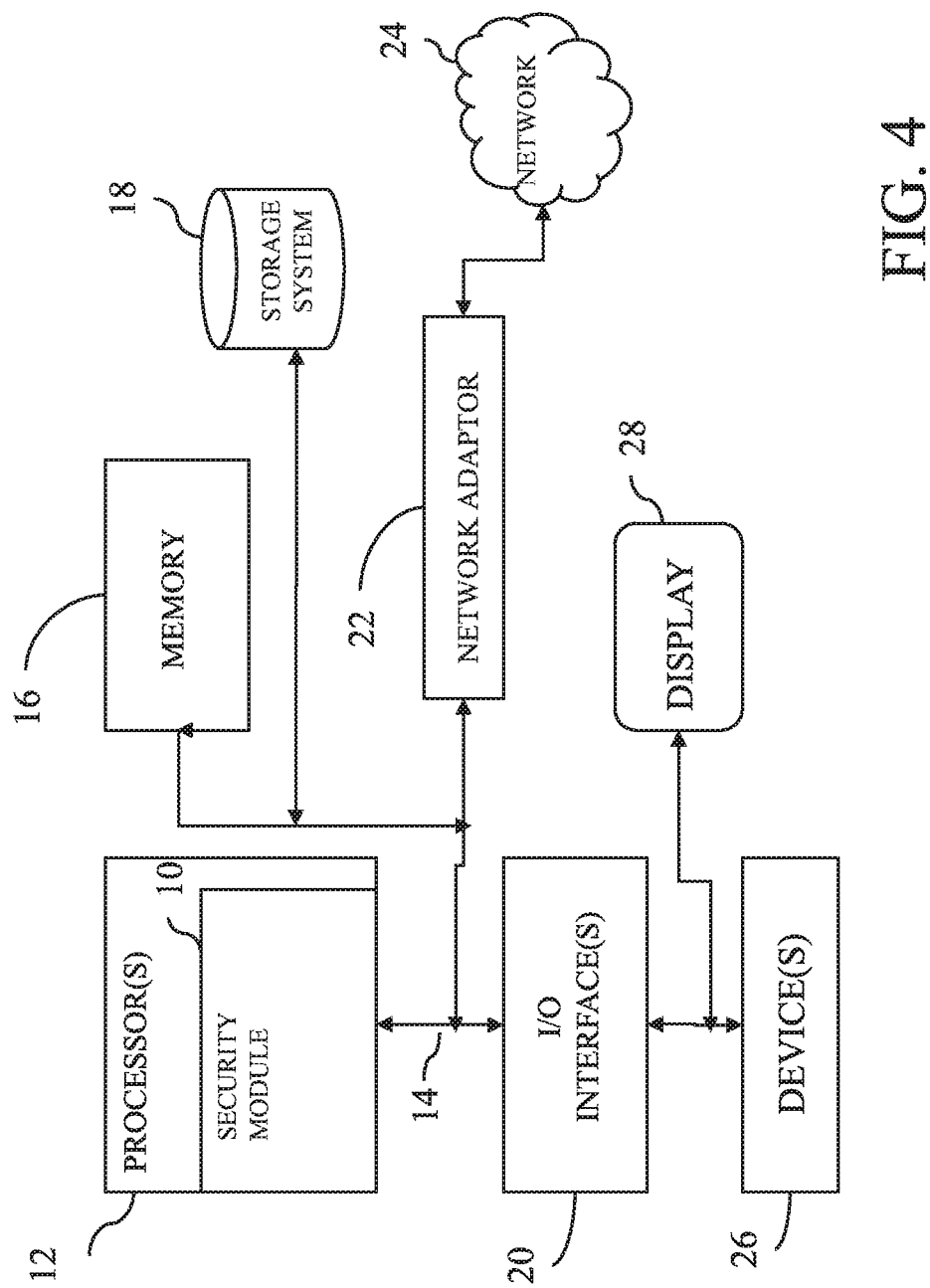
FIG. 4 illustrates a schematic of an example computer or processing system that may implement a dynamic risk communication system in one embodiment of the present disclosure.

FIG. 4 illustrates a schematic of an example computer or processing system that may implement a dynamic risk communication system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a dynamic risk communication module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of dynamic risk communication associated with a computer device, the method performed by one or more hardware processors, comprising:
automatically detecting one or more security risk factors for the computer device based on current context information associated with the computer device, the security risk factors used for authenticating a user, wherein for selected security risk factors the computer device requires additional information before authenticating the user;
determining whether an attempt is being made via the computer device to discover the one or more security risk factors that requires the additional information and to manipulate the computer device from using the selected security risk factors and from requiring the additional information;
responsive to determining that the attempt is being made to discover and manipulate the one or more security risk factors that requires the additional information, communicating a new challenge for additional identification for presenting on a user interface device of the computer device and suppressing an explanation of the one or more security risk factors from being presented on the user interface device.

2. The method of claim 1, wherein the one or more security risk factors are analyzed at a security risk determination engine to generate a security risk level based on the current context information and historical patterns associated with one or more users and the computer device.

3. The method of claim 2, wherein feedback from a user associated with the computer device is received, the feedback regarding the one or more security risk factors that are automatically detected, and the security risk level is recomputed based on the feedback.

4. The method of claim 1, further comprising communicating the one or more security risk factors by displaying risk indicators by at least one of text, visual (icons) and audio display.

5. The method of claim 1, further comprising generating one or more options that reduce the one or more security risk factors, the one or more options for presenting on the user interface device.

6. The method of claim 1, further comprising automatically mitigating a security risk for a user associated with one or more users and the computer device, wherein the automatically mitigating a security risk comprises at least one of altering or substituting a user authentication interaction technique.

7. The method of claim 1, further comprising:
responsive to determining that no attempt is being made to manipulate the one or more security risk factors, communicating the new challenge for additional identification and the one or more security risk factors for presentation on the user interface device.

8. The method of claim 1, wherein the automatically detecting of the one or more security risk factors comprises comparing the current context information associated with the computer device with historical patterns of user behavior associated with one or more users and the computer device.

9. A non-transitory computer readable storage medium storing a program of instructions executable by a machine to perform a method of dynamic risk communication associated with a computer device, the method comprising:
automatically detecting one or more security risk factors for the computer device based on current context information associated with the computer device, the security risk factors used for authenticating a user, wherein for selected security risk factors the computer device requires additional information before authenticating the user;
determining whether an attempt is being made via the computer device to discover the one or more security risk factors that requires the additional information and to manipulate the computer device from using the selected security risk factors and from requiring the additional information;
responsive to determining that the attempt is being made to discover and manipulate the one or more security risk factors that requires the additional information, communicating a new challenge for additional identification for presenting on a user interface device of the computer device and suppressing an explanation of the one or more security risk factors from being presented on the user interface device.

10. The non-transitory computer readable storage medium of claim 9, wherein the one or more security risk factors are analyzed at a security risk determination engine to generate a security risk level based on the current context information and historical patterns associated with one or more users and the computer device.

11. The non-transitory computer readable storage medium of claim 10, wherein feedback from a user associated with the computer device is received, the feedback regarding the one or more security risk factors that are automatically detected, and the security risk level is recomputed based on the feedback.

12. The non-transitory computer readable storage medium of claim 9, further comprising communicating the one or more security risk factors by displaying risk indicators by at least one of text, visual (icons) and audio display.

13. The non-transitory computer readable storage medium of claim 9, further comprising generating one or more options that reduce the one or more security risk factors, the one or more options for presenting on the user interface device.

14. The non-transitory computer readable storage medium of claim 9, further comprising automatically mitigating a security risk for a user associated with one or more users and the computer device, wherein the automatically mitigating a security risk comprises at least one of altering or substituting a user authentication interaction technique.

15. The non-transitory computer readable storage medium of claim 9, wherein the method further comprises, responsive to determining that no attempt is being made to manipulate the one or more security risk factors, communicating the new challenge for additional identification and the one or more security risk factors for presentation on the user interface device.

16. The non-transitory computer readable storage medium of claim 9, wherein the automatically detecting of the one or more security risk factors comprises comparing the current context information associated with the computer device with historical patterns of user behavior associated with one or more users and the computer device.

17. A system for dynamic risk communication associated with a computer device, comprising:
one or more computer processors coupled to a memory,
one or more of computer processors operable to automatically detect one or more security risk factors for the computer device based on current context information associated with the computer device, the security risk factors used for authenticating a user, wherein for selected security risk factors the computer device requires additional information before authenticating the user, one or more of computer processors further operable to determine whether an attempt is being made via the computer device to discover the one or more security risk factors that requires the additional information and to manipulate the computer device from using the selected security risk factors and from requiring the additional information, responsive to determining that the attempt is being made to manipulate the one or more security risk factors that requires the additional information, one or more of computer processors further operable to communicate a new challenge for additional identification for presenting on a user interface device of the computer device and suppress an explanation of the one or more security risk factors from being presented on the user interface device.

18. The system of claim 17, wherein the one or more security risk factors are analyzed at a security risk determination engine to generate a security risk level based on the current context information and historical patterns associated with one or more users and the computer device, and wherein feedback from a user associated with the computer device is received, the feedback regarding the one or more security risk factors that are automatically detected, and the security risk level is recomputed based on the feedback.

19. The system of claim 17, wherein responsive to determining that a second attempt is not being made to manipulate the one or more security risk factors, one or more of computer processors are further operable to communicate the new challenge for additional identification and the one or more security risk factors for presentation on the user interface device.

20. The system of claim 17, wherein one or more of computer processors are further operable further to communicate the one or more security risk factors by displaying risk indicators by at least one of text, visual (icons) and audio display.

* * * * *